(12) United States Patent
Kojima et al.

(10) Patent No.: US 9,185,240 B2
(45) Date of Patent: Nov. 10, 2015

(54) IMAGE TEST APPARATUS, IMAGE TEST SYSTEM, AND IMAGE TEST METHOD

(71) Applicants: Keiji Kojima, Kanagawa (JP); Hiroyoshi Ishizaki, Kanagawa (JP)

(72) Inventors: Keiji Kojima, Kanagawa (JP); Hiroyoshi Ishizaki, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/177,533

(22) Filed: Feb. 11, 2014

(65) Prior Publication Data
US 2014/0226189 A1 Aug. 14, 2014

(30) Foreign Application Priority Data

Feb. 12, 2013 (JP) ................................. 2013-024697
Jan. 10, 2014 (JP) ................................. 2014-003298

(51) Int. Cl.
| H04N 1/40 | (2006.01) |
| G03F 3/08 | (2006.01) |
| G06K 9/00 | (2006.01) |
| H04N 1/00 | (2006.01) |

(52) U.S. Cl.
CPC ....... *H04N 1/00013* (2013.01); *H04N 1/00005* (2013.01); *H04N 1/0005* (2013.01); *H04N 1/00015* (2013.01); *H04N 1/00042* (2013.01); *H04N 1/00045* (2013.01); *H04N 1/00063* (2013.01); *H04N 1/00074* (2013.01)

(58) Field of Classification Search
None
See application file for complete search history.

(56) References Cited

U.S. PATENT DOCUMENTS

| 5,874,988 | A  * | 2/1999  | Gu ................................... 348/97 |
| 6,675,174 | B1 * | 1/2004  | Bolle et al. ............................ 1/1 |
| 6,728,404 | B1 * | 4/2004  | Ono et al. ...................... 382/190 |
| 6,813,040 | B1 * | 11/2004 | Uchino et al. ................. 358/1.9 |
| 7,403,641 | B2 * | 7/2008  | Nakamoto et al. ............ 382/118 |
| 7,881,530 | B2 * | 2/2011  | Brothers et al. .............. 382/167 |
| 8,681,379 | B2 * | 3/2014  | Nakamura ..................... 358/1.9 |
| 2005/0057776 | A1 * | 3/2005 | Furukawa et al. ............. 358/2.1 |
| 2006/0077409 | A1 * | 4/2006 | Hoshii .......................... 358/1.9 |
| 2009/0262371 | A1 * | 10/2009 | Nakano ......................... 358/1.9 |
| 2010/0260353 | A1 * | 10/2010 | Ozawa .......................... 381/94.3 |
| 2012/0121139 | A1  | 5/2012 | Kojima et al. |
| 2013/0016374 | A1  | 1/2013 | Kawamoto et al. |
| 2013/0044347 | A1  | 2/2013 | Kitai et al. |
| 2013/0272606 | A1 * | 10/2013 | Nakamura .................... 382/167 |

FOREIGN PATENT DOCUMENTS

| JP | 10-049680 | 2/1998 |
| JP | 2005-205682 | 8/2005 |
| JP | 2012-103225 | 5/2012 |

* cited by examiner

*Primary Examiner* — Madelein Nguyen
(74) *Attorney, Agent, or Firm* — Oblon, McClelland, Maier & Neustadt, L.L.P.

(57) ABSTRACT

An image test apparatus includes an image generating unit acquiring an output target image with which an image is formed and output by an image forming apparatus, and generating a test image for testing the read image, an image test unit determining a defect of the read image based on a difference between the test image and the read image, a defect number determining unit determining number of defects contained in the read image based on a determination result of the defect of the read image, a frequency distribution generating unit accumulating defect numbers of multiple read images, each of the defect numbers being the number of defects detected in one read image, and generating a frequency distribution of the defect numbers, and an abnormality determination unit determining an abnormality of the image forming apparatus based on a change in the frequency distribution generated for each predetermined period.

11 Claims, 14 Drawing Sheets

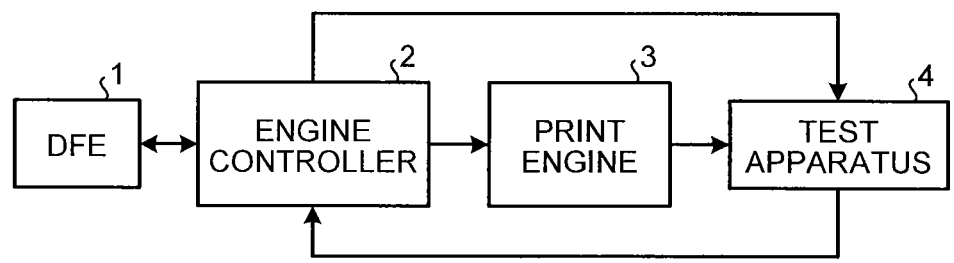
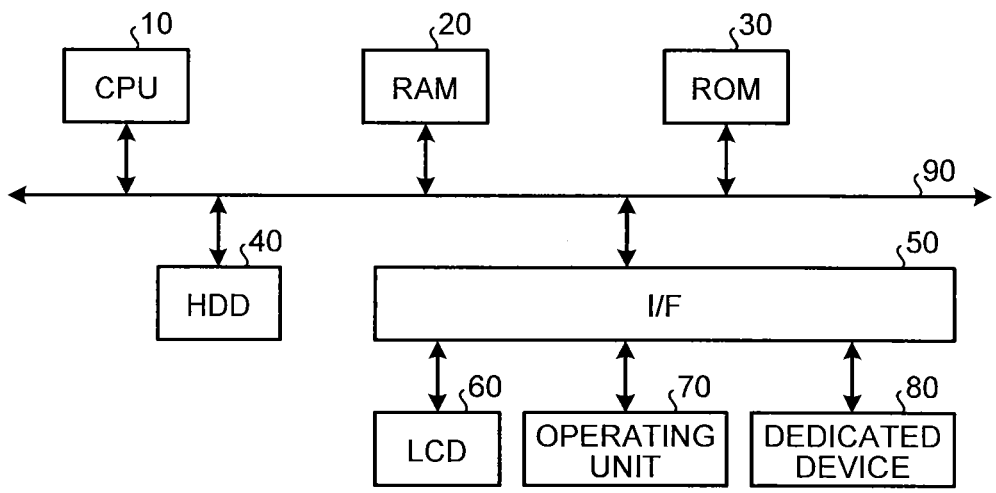

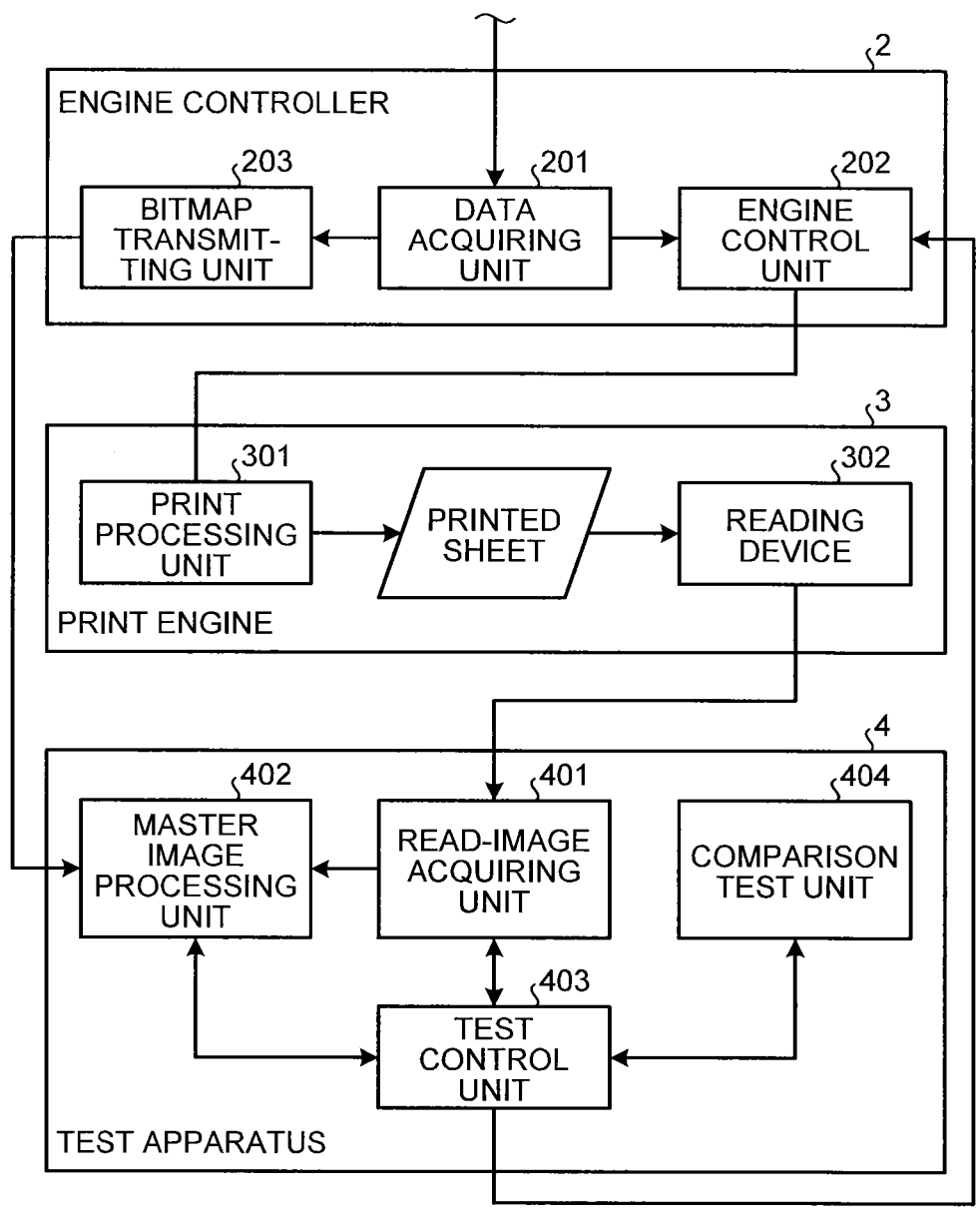

FIG.8

|     | $B_{11}$ |     |     | $B_{12}$ |     |
|-----|-----|-----|-----|-----|-----|
| $D_{11}$ | $D_{12}$ | $D_{13}$ | $D_{14}$ | $D_{15}$ | $D_{16}$ |
| $D_{21}$ | $D_{22}$ | $D_{23}$ | $D_{24}$ | $D_{25}$ | $D_{26}$ |
| $D_{31}$ | $D_{32}$ | $D_{33}$ | $D_{34}$ | $D_{35}$ | $D_{36}$ |
| $D_{41}$ | $D_{42}$ | $D_{43}$ | $D_{44}$ | $D_{45}$ | $D_{46}$ |
| $D_{51}$ | $D_{52}$ | $D_{53}$ | $D_{54}$ | $D_{55}$ | $D_{56}$ |
| $D_{61}$ | $D_{62}$ | $D_{63}$ | $D_{64}$ | $D_{65}$ | $D_{66}$ |

| $B_{11}$ | $B_{12}$ | $B_{13}$ | $B_{14}$ |
|-----|-----|-----|-----|
| $B_{21}$ | $B_{22}$ | $B_{23}$ | $B_{24}$ |
| $B_{31}$ | $B_{32}$ | $B_{33}$ | $B_{34}$ |
| $B_{41}$ | $B_{42}$ | $B_{43}$ | $B_{44}$ |

...

| 0 | 0 | 0 | 0 |
|---|---|---|---|
| 0 | 1 | 1 | 0 |
| 0 | 0 | 1 | 0 |
| 0 | 1 | 0 | 0 |

...

FIG.11
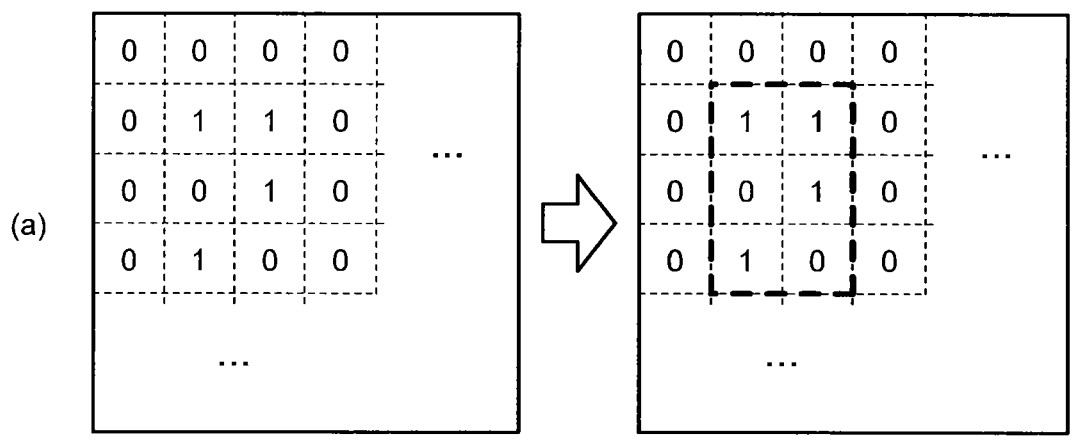
(a)
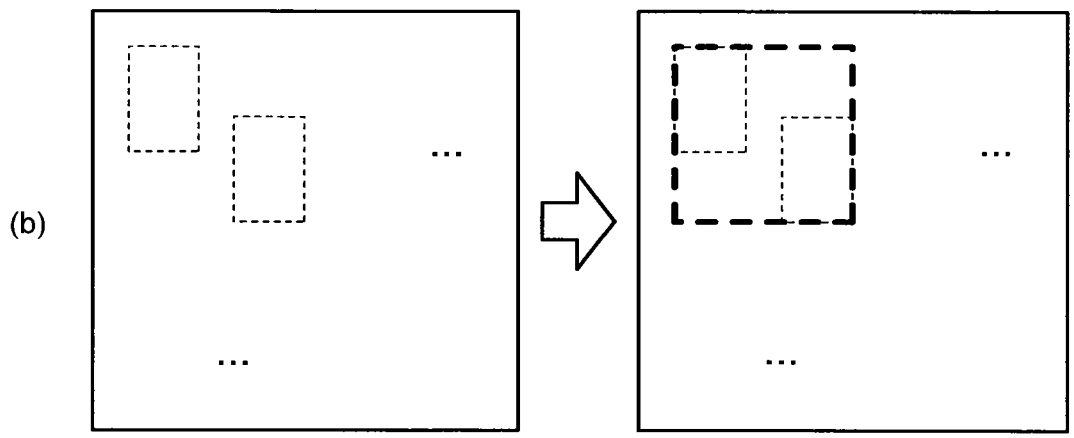
(b)

FIG.12

| PAGE ID | DEFECT NUMBER |
|---|---|
| 001 | 0 |
| 002 | 0 |
| 003 | 1 |
| 004 | 2 |
| 005 | 1 |
| 006 | 1 |
| 007 | 0 |
| 008 | 1 |
| 009 | 3 |
| ... | |

FIG.13

| DEFECT NUMBER | COUNT VALUE | | |
|---|---|---|---|
| | PERIOD $T_1$ | PERIOD $T_2$ | PERIOD $T_3$ |
| 0 | 76 | 56 | 35 |
| 1 | 86 | 66 | 45 |
| 2 | 31 | 71 | 55 |
| 3 | 5 | 5 | 61 |
| 4 | 2 | 1 | 2 |
| 5 | 0 | 0 | 1 |
| 6 | 0 | 1 | 0 |
| 7 | 0 | 0 | 1 |
| 8 | 0 | 0 | 0 |
| ... | | | |

| MODE | 1 |
|---|---|
| PERSENTAGE OF MODE | 43 |
| PERSENTAGE OF VALUES SMALLER THAN MODE | 81 |
| DATA WIDTH | 5 |
| DEGREE OF DISTORTION | 1.7 |
| KURTOSIS | 1.3 |

FIG.18

| ITEM | $T_1$ | $T_3$ | DIFFERENCE |
|---|---|---|---|
| MODE | 1 | 3 | 2 |
| PERSENTAGE OF MODE | 43 | 30 | 13 |
| PERSENTAGE OF VALUES SMALLER THAN MODE | 81 | 98 | 17 |
| DATA WIDTH | 5 | 8 | 3 |
| DEGREE OF DISTORTION | 1.7 | 0.9 | 0.8 |
| KURTOSIS | 1.3 | -1.3 | 2.6 |

FIG.19

| DEFECT GROUP ID | $X_s$ | $Y_s$ | $X_e$ | $Y_e$ | |
|---|---|---|---|---|---|
| 001 | 20 | 2 | 30 | 2200 | |
| 002 | 1822 | 50 | 2011 | 278 | ... |
| 003 | 500 | 1524 | 653 | 1789 | |
| ... | | | | | |

FIG.20

| DEFECT TYPE ID | XS | YS | XE | YE | DEFECT TYPE | |
|---|---|---|---|---|---|---|
| 001 | 20 | 2 | 30 | 2200 | FAILURE OF COMPONENT A | |
| 002 | 1822 | 50 | 2011 | 278 | FAILURE OF COMPONENT B | ... |
| 003 | 500 | 1524 | 653 | 1789 | FAILURE OF COMPONENT C | |
| ... | | | | | | |

MASTER IMAGE   READ IMAGE (a)

(b)

IMAGE TEST APPARATUS, IMAGE TEST SYSTEM, AND IMAGE TEST METHOD

CROSS-REFERENCE TO RELATED APPLICATIONS

The present application claims priority to and incorporates by reference the entire contents of Japanese Patent Application No. 2013-024697 filed in Japan on Feb. 12, 2013 and Japanese Patent Application No. 2014-003298 filed in Japan on Jan. 10, 2014.

BACKGROUND OF THE INVENTION

1. Field of the Invention

The present invention relates to an image test apparatus, an image test system, and an image test method, and in particular, relates to a technology for diagnosing an apparatus based on an image test result.

2. Description of the Related Art

Conventionally, inspection of printed materials has been performed manually. However, in recent years, apparatuses that perform the inspection as post processing of offset printing are increasingly used. In such inspection apparatuses, first, a good-quality image is manually selected and loaded from among read images of printed materials, and a master image used as a reference is generated. Then, in the inspection apparatus, corresponding portions between the generated master image and the read image of the printed material used as a test object are compared with each other, and a defect of the printed material is determined based on the degree of a difference.

However, non-impact printing apparatuses, such as electrophotographic printers, that have recently become popular, have advantages in handling small-lot printing, and cope with a lot of cases, such as variable printing, in which different contents are printed for different pages. Therefore, unlike the offset printer, it is not effective to generate a master image from printed materials and use the master image as an object for comparison. To cope with this, it may be possible to generate a master image from print data. With this configuration, the variable printing may be handled effectively.

As an image test process as described above, a predetermined threshold is set for the degree of the difference as described above, that is, for a result of pixel-by-pixel comparison between an image obtained by reading an output sheet and a master image generated based on print data after positional alignment and size adjustment between the images are completed, and then whether or not there is a defect in the printed material is determined.

Alternatively, as a method to collect pieces of information available to determine a defected portion of an inner part of the image forming apparatus, an image forming apparatus extracts defects of images output on recording media, such as sheets of paper, and generates information by accumulating defects for each of the positions of the images for the determination (see, for example, Japanese Laid-open Patent Publication No. 2005-205682).

However, Japanese Laid-open Patent Publication No. 2005-205682 only discloses that a difference value accumulated for each pixel is used as the information for the determination performed by an operator. Therefore, the operator needs to perform final determination one after another, which becomes a burden on the operator. Namely, with only the technology disclosed in Japanese Laid-open Patent Publication No. 2005-205682, the determination of degradation of the apparatuses depends on the operator's determination capability, so that the degradation of the apparatuses may not be determined in a preferred manner. In addition, the above-mentioned problems can be occurred not only in case where an image is formed onto a sheet of paper but in case where an image is formed onto any of recording media other than the sheet of paper, for example, a film.

In light of the circumstances as described above, there is a need to enable determination of degradation of apparatuses based on a result of an image test, in which an image obtained by reading an output result of image formation is compared with a master image.

SUMMARY OF THE INVENTION

It is an object of the present invention to at least partially solve the problems in the conventional technology.

According to the present invention, there is provided an image test apparatus that tests a read image obtained by reading an image formed and output on a sheet by an image forming apparatus, the image test apparatus comprising: an image generating unit configured to acquire an output target image with which the image is formed and output by the image forming apparatus, and generate a test image for testing the read image; an image test unit configured to determine a defect of the read image based on a difference between the test image and the read image; a defect number determining unit configured to determine number of defects contained in the read image based on a determination result of the defect of the read image; a frequency distribution generating unit configured to accumulate defect numbers of multiple read images, each of the defect numbers being the number of defects detected in one read image, and generate a frequency distribution of the defect numbers; and an abnormality determination unit configured to determine an abnormality of the image forming apparatus based on a change in the frequency distribution generated for each predetermined period.

The present invention also provides an image test system that tests a read image obtained by reading an image formed and output on a sheet, the image test system comprising: an image forming unit configured to form and output the image; an image reading unit configured to read the sheet on which the image is formed and output, and generate the read image; a test image generating unit configured to acquire an output target image with which the image is formed and output by the image forming unit, and generate a test image for testing the read image; an image test unit configured to determine a defect of the read image based on a difference between the test image and the read image; a defect number determining unit configured to determine number of defects contained in the read image based on a determination result of the defect of the read image; a frequency distribution generating unit configured to accumulate defect numbers of multiple read images, each of the defect numbers being the number of defects detected in one read image, and generate a frequency distribution of the defect numbers; and an abnormality determination unit configured to determine an abnormality of at least one of the image forming unit and the image reading unit based on a change in the frequency distribution generated for each predetermined period.

The present invention also provides an image test method that tests a read image obtained by reading an image formed and output on a sheet by an image forming apparatus, the image test method comprising: generating the read image by reading the sheet on which the image is formed and output; generating a test image for testing the read image by acquiring an output target image with which the image is formed and output by the image forming apparatus; determining a defect of the read image based on a difference between the test image and the read image; determining number of defects contained in the read image based on a determination result of the defect of the read image; accumulating defect numbers of multiple read images, each of the defect numbers being the number of defects detected in one read image, thereby generating a frequency distribution of the defect numbers; and determining an abnormality of the image forming apparatus based on a change in the frequency distribution generated for each predetermined period.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating a configuration of an image forming system including a test apparatus according to an embodiment;

FIG. 2 is a block diagram illustrating a hardware configuration of the test apparatus according to the embodiment;

FIG. 3 is a block diagram illustrating functional configurations of an engine controller, a print engine, and the test apparatus according to the embodiment;

FIG. 8 is a diagram illustrating an example of test areas according to the embodiment;

FIG. 9 is a diagram illustrating an example of test results of test areas according to the embodiment;

FIGS. 11(a) and 11(b) are diagrams illustrating an example of determination of a circumscribed rectangle according to the embodiment;

FIG. 12 is a diagram illustrating an example of defect number information according to the embodiment;

FIG. 13 is a diagram illustrating a count result of the defect number information according to the embodiment;

FIG. 18 is a diagram illustrating an example of comparison between pieces of the feature data of the frequency distribution graphs according to the embodiment;

FIG. 19 is a diagram illustrating an example of defect group positional information according to the embodiment;

FIG. 20 is a diagram illustrating an example of a defect database (DB) according to the embodiment;

DETAILED DESCRIPTION OF THE PREFERRED EMBODIMENTS

Figure 4:
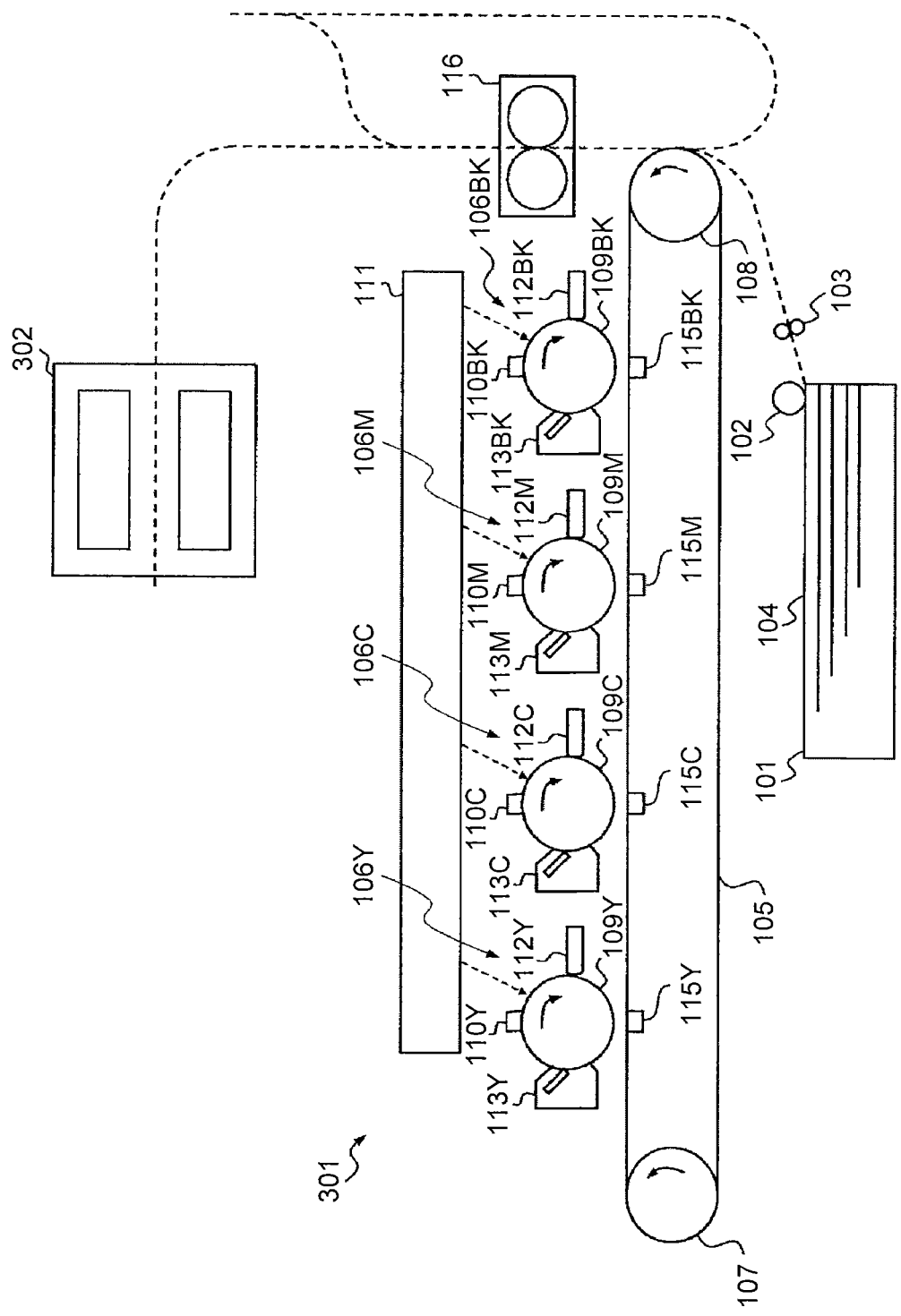
FIG. 4 is a diagram illustrating a mechanical configuration of a print processing unit according to the embodiment.

Embodiments of the present invention will be explained in detail below with reference to the accompanying drawings. In the embodiments, explanation will be given of an image test system including a test apparatus that compares a read image obtained by reading an output result of image formation with a master image to test the output result, and a process for determining whether there is a failure in an apparatus based on a result of the test.

FIG. 1 is a diagram illustrating an overall configuration of an image forming system according to an embodiment. As illustrated in FIG. 1, the image forming system according to the embodiment includes a digital front end (DFE) 1, an engine controller 2, a print engine 3, and a test apparatus 4. The DFE 1 generates image data to be printed out based on a received print job, that is, bitmap data as an output target image, and outputs the generated bitmap data to the engine controller 2.

The engine controller 2 causes the print engine 3 to form and output an image based on the bitmap data received from the DFE 1. Furthermore, the engine controller 2 according to the embodiment transmits, to the test apparatus 4, the bitmap data received from the DFE 1 as information serving as a source of a test image to be referred to by the test apparatus 4 for testing an output result of image formation performed by the print engine 3.

The print engine 3 forms and outputs onto a paper-sheet that is the recording medium an image based on the bitmap data under the control of the engine controller 2, and inputs, in the test apparatus 4, read image data generated by reading an output sheet by a reading device. In addition, as the recording medium other than the paper-sheet, all types of recording media using for image formation and image output such as a recording film, a sheet-like recording medium formed of plastics material can be used. The test apparatus 4 generates a master image based on the bitmap data input by the engine controller 2.

The test apparatus 4 is an image test apparatus that compares the read image input by the print engine 3 with the master image generated as described above, to thereby test the output result. Furthermore, the test apparatus 4 according to the embodiment has a function to diagnose degradation of the print engine 3 side based on a result of the image test. This function relates to a feature of the embodiment.

Hardware configurations of functional blocks of the engine controller 2, the print engine 3, and the test apparatus 4 according to the embodiment will be explained below with reference to FIG. 2. FIG. 2 is a block diagram illustrating the hardware configuration of the test apparatus 4 according to the embodiment. While the hardware configuration of the test apparatus 4 is illustrated in FIG. 2, the engine controller 2 and the print engine 3 have the same hardware configuration.

As illustrated in FIG. 2, the test apparatus 4 according to the embodiment has the same configuration as a general information processing apparatus, such as a personal computer (PC) or a server. Specifically, the test apparatus 4 according to the embodiment includes a central processing unit (CPU) 10, a random access memory (RAM) 20, a read only memory (ROM) 30, a hard disk drive (HDD) 40, and an interface (I/F) 50, all of which are connected to one another via a bus 90. Furthermore, a liquid crystal display (LCD) 60, an operating unit 70, and a dedicated device 80 are connected to the I/F 50.

The CPU 10 is an arithmetic unit and controls the entire operation of the test apparatus 4. The RAM 20 is a volatile storage medium that can read and write information at high speed, and is used as a work area by the CPU 10 to process information. The ROM 30 is a read-only nonvolatile storage medium, and stores therein programs, such as firmware. The HDD 40 is a nonvolatile storage medium that can read and write information, and stores therein an operating system (OS), various control programs, application programs, or the like.

The I/F 50 connects various types of hardware and networks to the bus 90 and controls the connected devices. The LCD 60 is a visual user interface that allows a user to check the state of the test apparatus 4. The operating unit 70 is a user interface, such as a keyboard or a mouse, that allows a user to input information in the test apparatus 4.

The dedicated device 80 is hardware for implementing functions specific to the engine controller 2, the print engine 3, or the test apparatus 4. In the case of the print engine 3, the dedicated device 80 may be a plotter that forms and outputs images onto sheets of paper or may be a reading device that reads images output on the sheets. In the case of the engine controller 2 and the test apparatus 4, the dedicated device 80 may be a dedicated arithmetic device that performs image processing at high speed. The arithmetic device may be configured as, for example, an application specific integrated circuit (ASIC).

In the hardware configuration as described above, programs stored in the ROM 30, the HDD 40, or a recording medium such as an optical disk (not illustrated) are loaded into the RAM 20, and the CPU 10 performs calculations based on the programs to implement a software control unit. The software control unit implemented as described above and the hardware are combined to realize the functional blocks that implement the functions of the engine controller 2, the print engine 3, and the test apparatus 4 according to the embodiment.

FIG. 3 is a block diagram illustrating functional configurations of the engine controller 2, the print engine 3, and the test apparatus 4 according to the embodiment. As illustrated in FIG. 3, the engine controller 2 according to the embodiment includes a data acquiring unit 201, an engine control unit 202, and a bitmap transmitting unit 203. The print engine 3 includes a print processing unit 301 and a reading device 302. The test apparatus 4 includes a read-image acquiring unit 401, a master image processing unit 402, a test control unit 403, and a comparison test unit 404.

The data acquiring unit 201 acquires the bitmap data input by the DFE 1 and operates the engine control unit 202 and the bitmap transmitting unit 203. The bitmap data is information on pixels of an image to be formed and output. The engine control unit 202 causes the print engine 3 to form and output an image based on the bitmap data transferred by the data acquiring unit 201. The bitmap transmitting unit 203 transmits the bitmap data acquired by the data acquiring unit 201 to the test apparatus 4.

The print processing unit 301 is an image forming unit that acquires the bitmap data input by the engine controller 2, forms and outputs an image on a printing sheet, and outputs the printed sheet. The print processing unit 301 according to the embodiment is implemented by a general image forming mechanism of an electrophotographic system. The reading device 302 is an image reading unit that reads the image formed on the surface of the printed sheet output by the print processing unit 301, and outputs the read data to the test apparatus 4.

The reading device 302 is, for example, a line scanner mounted on a conveying path of the printed sheet output by the print processing unit 301, and scans the surface of the printed sheet being conveyed, thereby reading an image formed on the surface. While the print engine 3 includes the reading device 302 in the example described in the embodiment, the reading device may be included in the test apparatus 4.

Mechanical configurations of the print processing unit 301 and the reading device 302 will be explained below with reference to FIG. 4. As illustrated in FIG. 4, the print processing unit 301 according to the embodiment is a so-called tandem type, in which image forming units 106 for different colors are arranged along a conveying belt 105 that serves as an endless moving unit. Specifically, multiple image forming units (electrophotographic processing units) 106BK, 106M, 106C, and 106Y are arranged in sequence from the upstream side in the conveying direction of the conveying belt 105, along the conveying belt 105 that is an intermediate transfer belt on which an intermediate transfer image is formed for transfer onto a sheet (an example of the recording medium) that is separated and fed from a sheet feed tray 101 by a feed roller 102 and a separation roller 103.

The image forming units 106BK, 106M, 106C, and 106Y have the same internal configurations except that colors of toner images to be formed are different. The image forming unit 106BK forms a black image, the image forming unit 106M forms a magenta image, the image forming unit 106C forms a cyan image, and the image forming unit 106Y forms a yellow image. In the explanation below, the image forming unit 106BK will be described in detail. The other image forming units 106M, 106C, and 106Y have the same configurations as the image forming unit 106BK; therefore, components of the image forming units 106M, 106C, and 106Y are denoted by reference symbols M, C, and Y instead of BK denoting the components of the image forming unit 106BK, and explanation thereof will be omitted.

The conveying belt 105 is an endless belt, that is, a loop belt, extended between a driving roller 107 and a driven roller 108 that are driven to rotate. The driving roller 107 is driven to rotate by a driving motor (not illustrated). The driving motor, the driving roller 107, and the driven roller 108 function as a driving unit that moves the conveying belt 105 serving as the endless moving unit.

In image formation, the image forming unit 106BK first transfers a black toner image to the conveying belt 105 being rotated. The image forming unit 106BK includes a photosensitive drum 109BK as a photoconductor, and also includes a charging unit 110BK, an optical writing device 111, a developing unit 112BK, a photoconductor cleaner (not illustrated), and a neutralizing unit 113BK arranged around the photosensitive drum 109BK. The optical writing device 111 applies light to each of the photosensitive drums 109BK, 109M, 109C, and 109Y (hereinafter, collectively referred to as a "photosensitive drum 109").

In the image formation, the charging unit 110BK uniformly charges the outer surface of the photosensitive drum 109BK in a dark environment, and the optical writing device 111 performs optical writing with light emitted by a light source corresponding to a black image, so that an electrostatic latent image is formed. The developing unit 112BK develops the electrostatic latent image with black toner, so that a black toner image is formed on the photosensitive drum 109BK.

The toner image is transferred onto the conveying belt 105 due to the action of a transfer unit 115BK at a position (transfer position) at which the photosensitive drum 109BK and the conveying belt 105 come into contact with or come closest to each other. With this transfer, the black toner image is formed on the conveying belt 105. After the transfer of the toner image is completed, the photoconductor cleaner removes residual toner remaining on the outer surface of the photosensitive drum 109BK, and the neutralizing unit 113BK neutralizes the outer surface as preparation for next image formation.

The black toner image transferred to the conveying belt 105 by the image forming unit 106BK as described above is conveyed to the next image forming unit 106M by the roller drive of the conveying belt 105. In the image forming unit 106M, a magenta toner image is formed on the photosensitive drum 109M through the same process as the image forming process performed by the image forming unit 106BK, and the toner image is transferred onto the already-formed black image in a superimposed manner.

The black and magenta toner images transferred onto the conveying belt 105 are further conveyed to the image forming units 106C and 106Y, and a cyan toner image formed on the photosensitive drum 109C and a yellow toner image formed on the photosensitive drum 109Y through the same operation are transferred onto the already-transferred images in a superimposed manner. Consequently, a full-color intermediate transfer image is formed on the conveying belt 105.

Sheets 104 housed in the sheet feed tray 101 are fed one by one from the topmost sheet, and the intermediate transfer image formed on the conveying belt 105 is transferred onto the surface of the sheet 104 at a position at which the conveying path and the conveying belt 105 come into contact with or come closest to each other. Therefore, an image is formed on the surface of the sheet 104. The sheet 104 on which the image is formed is further conveyed to a fixing unit 116, in which the image is fixed, and then conveyed to the reading device 302.

In the reading device 302, an internal line scanner captures an image of the surface of the document and generates a read image. In the case of duplex printing, the sheet on which the image is fixed is conveyed to a reverse path to reverse the sheet, and the reversed sheet is conveyed again to the transfer position.

Referring back to FIG. 3, components of the test apparatus 4 will be explained below. The read-image acquiring unit 401 acquires information on the read image that the reading device 302 of the print engine 3 has generated by reading the surface of a printed sheet. The information on the read image acquired by the read-image acquiring unit 401 is input to the comparison test unit 404 for a comparison test. Incidentally, the read image is input to the comparison test unit 404 under the control of the test control unit 403. In this case, the read image is input to the comparison test unit 404 after the test control unit 403 has acquired the read image.

The master image processing unit 402 acquires the bitmap data input by the engine controller 2 and generates a master image that is a test image to be compared with a test target image as described above. Namely, the master image processing unit 402 functions as a test image generating unit that generates, based on the output target image, a master image used as a test image for testing the read image. A master image generation process performed by the master image processing unit 402 will be explained in detail later.

The test control unit 403 is a control unit that controls the entire operation of the test apparatus 4. The components included in the test apparatus 4 operate under the control of the test control unit 403. The comparison test unit 404 compares the read image input by the read-image acquiring unit 401 with the master image generated by the master image processing unit 402, and determines whether or not a desired image has been formed and output. The comparison test unit 404 is implemented by an ASIC as described above in order to rapidly perform huge amount of calculations. In the embodiment, the test control unit 403 functions as an image test unit by controlling the comparison test unit 404.

Figure 5:
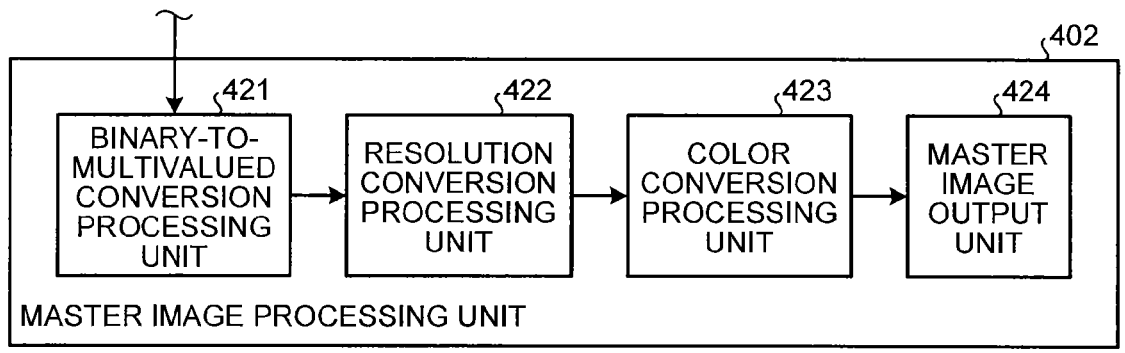
FIG. 5 is a block diagram illustrating a functional configuration of a master image processing unit according to the embodiment.

The functions of the master image processing unit 402 will be explained in detail below with reference to FIG. 5. FIG. 5 is a block diagram illustrating an internal configuration of the master image processing unit 402. As illustrated in FIG. 5, the master image processing unit 402 includes a binary-to-multivalued conversion processing unit 421, a resolution conversion processing unit 422, a color conversion processing unit 423, and a master image output unit 424. Incidentally, the master image processing unit 402 according to the embodiment is implemented by causing the dedicated device 80 illustrated in FIG. 2, that is, hardware configured as an ASIC, to operate under the control of software.

The binary-to-multivalued conversion processing unit 421 performs binary-to-multivalued conversion process on a color or monochrome binary image, to thereby generate a multivalued image. In the embodiment, the bitmap data is information to be input to the print engine 3, and the print engine forms and outputs images based on binary images of respective colors of CMYK (cyan, magenta, yellow, and black). In contrast, the read image serving as the test target image is a multivalued image with multiple tones of three primary colors of RGB (red, green, and blue). Therefore, the binary-to-multivalued conversion processing unit 421 first converts a binary image to a multivalued image. As the multivalued image, for example, an 8-bit CMYK image may be used.

Incidentally, while, in the embodiment, the print engine 3 forms and outputs an image based on the binary images of respective CMYK colors and the master image processing unit 402 includes the binary-to-multivalued conversion processing unit 421, this is a mere example. Specifically, if the print engine 3 forms and outputs an image based on a multivalued image, the binary-to-multivalued conversion processing unit 421 may be omitted.

The resolution conversion processing unit 422 converts the resolution of the multivalued image generated by the binary-to-multivalued conversion processing unit 421, in order to match the resolution of the read image serving as a test target image. In the embodiment, the reading device 302 generates the read image of 200 dots per inch (dpi). Therefore, the resolution conversion processing unit 422 converts the resolution of the multivalued image generated by the binary-to-multivalued conversion processing unit 421 to 200 dpi.

The color conversion processing unit 423 acquires the image with the resolution converted by the resolution conversion processing unit 422, and performs color conversion. As described above, in the embodiment, the read image is an image in the RGB format. Therefore, the color conversion processing unit 423 converts the image in the CMYK format with the resolution converted by the resolution conversion processing unit 422 into an image in the RGB format. Therefore, a multivalued image of 200 dpi is generated, in which each of pixels is represented by 8-bit RGB colors (24 bits in total).

The master image output unit 424 outputs the master image generated by the binary-to-multivalued conversion processing unit 421, the resolution conversion processing unit 422, and the color conversion processing unit 423 to the test control unit 403. The test control unit 403 causes the comparison test unit 404 to perform an image comparison process based on the master image acquired from the master image processing unit 402, and acquires a result of the comparison.

The comparison test unit 404 performs pixel-by-pixel comparison between the read image and the master image, each having the resolution of 200 dpi with 8-bit RGB colors, and calculates difference values of pixel values of the 8-bit RGB colors for each of pixels. The comparison test unit 404 determines whether or not there is a defect in the read image based on a magnitude relationship between each of the difference values calculated as described above and a threshold.

Figure 22:
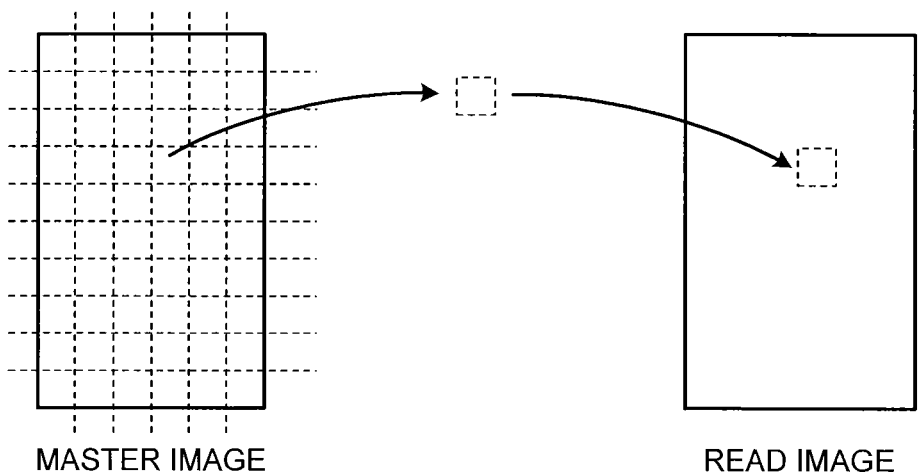
FIG. 22 is a diagram illustrating an example of the comparison test according to the embodiment.

Incidentally, to compare the read image and the master image, as illustrated in FIG. 22, the test control unit 403 overlaps the master image, which is divided for each predetermined region, with the read image corresponding to the divided region, and calculates a difference in the pixel value, i.e., the density, for each of the pixels. This process is realized by causing the test control unit 403 to acquire images of the respective overlapped regions from the master image and the read image and input the acquired images to the comparison test unit 404.

Furthermore, the test control unit 403 determines, as a correct overlapping position corresponding to an extracted region of the master image, that is, as a corresponding extracted region of the read image, an extracted region having the smallest total of the difference values that are calculated by vertically and horizontally shifting the overlapping position where the divided region is overlapped with the read image, that is, by vertically and horizontally shifting the region of the image acquired from the read image, and employs, as a comparison result, the difference values of the respective pixels calculated at this time.

Each of divided cells of a grid as illustrated in FIG. 22 serves as the predetermined region, in which the total of the difference values of the respective pixels is calculated. Furthermore, the size of each of the divided regions as illustrated in FIG. 22 is determined based on, for example, a region for which the comparison test unit 404 configured as the ASIC as described above can compare the pixel values at one time.

Furthermore, as another method, there is a method to first determine whether each of the pixels is normal or defective based on a comparison result between the difference value calculated for each of the pixels and a threshold, and then compare a count value of the number of pixels that are determined as defective with a threshold set for the count value. Moreover, it may be possible to determine whether there is a defect for each of the pixels, instead of determining whether there is a defect for each of the predetermined regions as described above.

Through the above processes, the difference values are calculated after the positions of the read image and the master image are aligned. For example, even when the scale of the entire read image and the scale of the entire master image differ from each other, if the position alignment is performed by dividing the images for each of the regions as illustrated in FIG. 22, it becomes possible to reduce the influence of the scales.

Furthermore, it is expected that the amount of positional deviation of an adjacent region is relatively close to that of each of the divided regions illustrated in FIG. 22. Therefore, when performing a comparison test for each of the divided regions, if the calculation is performed by vertically and horizontally shifting the position with respect to the amount of positional deviation determined by the comparison test performed on the adjacent region, it becomes highly likely that the calculation can be performed at the correct overlapping position even if the number of calculations at the vertically and horizontally shifted positions is reduced. Therefore, it becomes possible to reduce the amount of the entire calculation.

In the above explanation, an example is described in which the comparison test unit 404 calculates and outputs a difference value between the pixel of the master image and the pixel of the read image and the test control unit 403 compares the difference value with the threshold. Alternatively, it may be possible to cause the comparison test unit 404 to compare the difference value and the threshold, and cause the test control unit 403 to acquire the comparison result, that is, information indicating whether a difference between each of the pixels of the read image and a corresponding pixel of the master image exceeds the predetermined threshold. In this configuration, it becomes possible to transfer the comparison process using the threshold from the test control unit 403 to the comparison test unit 404, enabling to increase the processing speed because of the use of hardware.

In the system as described above, a feature of the embodiment is that the test apparatus 4 diagnoses failures of the components of the print engine 3, in particular, failures of the print processing unit 301 and the reading device 302 illustrated in FIG. 4, based on a test result of the read image obtained through the comparison process as described above. In the following, the functions and operation of the test control unit 403 according to the embodiment will be explained.

Figure 6:
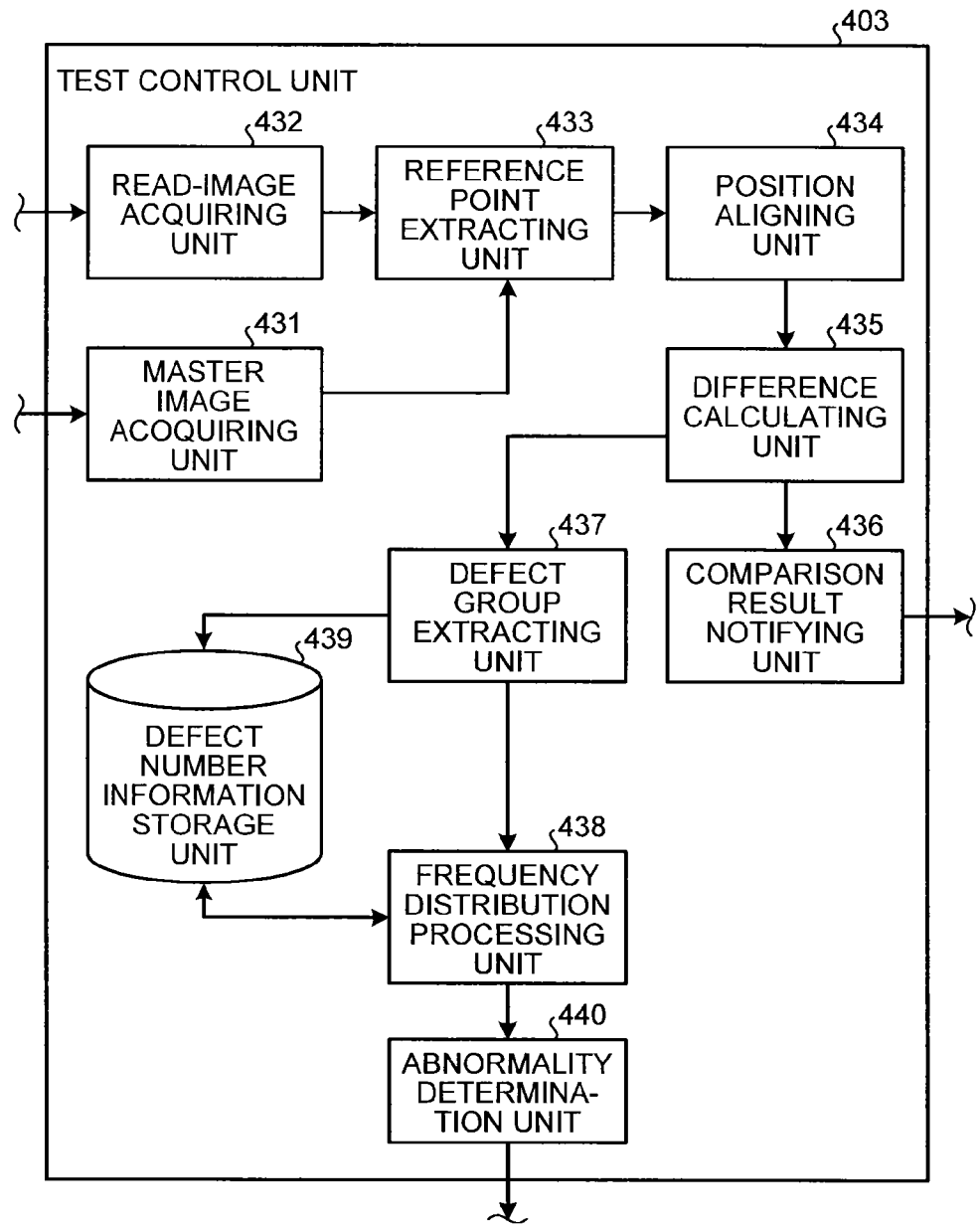
FIG. 6 is a block diagram illustrating a functional configuration of a test control unit according to the embodiment.
Figure 7:
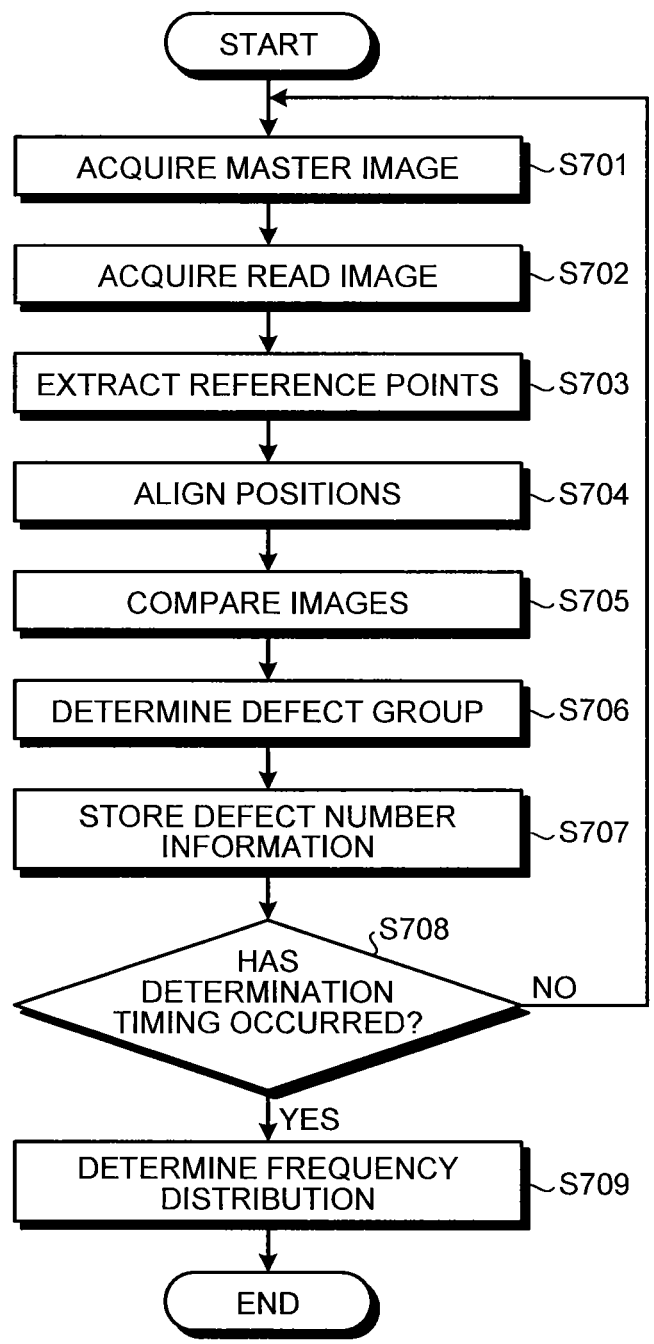
FIG. 7 is a flowchart illustrating the entire flow of a comparison test according to the embodiment.

FIG. 6 is a block diagram illustrating a functional configuration of the test control unit 403 according to the embodiment. FIG. 7 is a flowchart illustrating operation of the test control unit 403 and the comparison test unit 404 according to the embodiment. In the test control unit 403 according to the embodiment, as illustrated in FIG. 6, a master image acquiring unit 431 acquires the master image generated by the master image processing unit 402 (Step S701).

Figure 23:
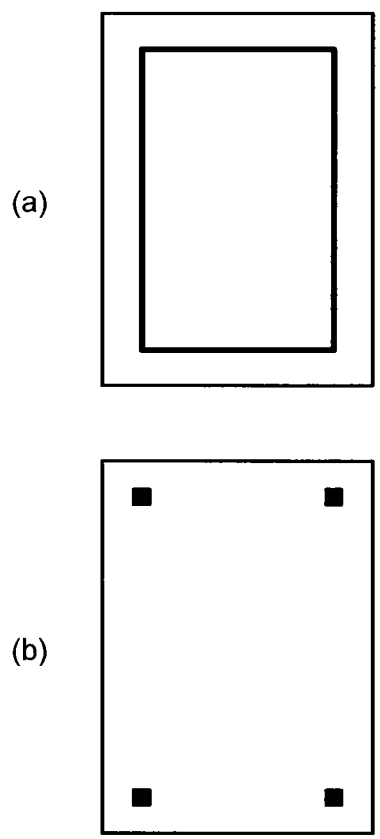
FIGS. 23(a) and 23(b) are diagrams illustrating results of processing with a corner extraction filter according to the embodiment

A read-image acquiring unit 432 acquires the read image from the read-image acquiring unit 401 (Step S702), and a reference point extracting unit 433 extracts reference points from the master image and the read image (Step S703). The reference points are markings displayed at four corners of a region in a document serving as an object of image formation and image output. Incidentally, if there is no marking as described above, it may be possible to extract pixels as shown in FIG. 23(b) that can be used as markings from the image as shown in FIG. 23(a) by using an image filter, such as a corner extraction filter.

When the reference point extracting unit 433 extracts the reference points from the master image and the read image, a position aligning unit 434 aligns the positions of the images based on the positions of the reference points in each of the images, that is, based on the coordinate of each of the images (Step S704), and a difference calculating unit 435 compares the images subjected to the position alignment (Step S705). At Steps S704 and S705, the position aligning unit 434 and the difference calculating unit 435 perform the processes by causing the comparison test unit 404 to perform a comparative calculation process on the images and acquire a result of the comparison.

At Step S704, the comparison test unit 404 that performs the position alignment under the control of the position aligning unit 434 gradually shifts overlapping position of the master image and the read image in a relatively wide region, for example, in a region of 20 pixels in height and width, calculates a difference value for each of overlapping pixels, and calculates the total of the difference values. The position aligning unit 434 determines a state with the smallest total as the position-aligned state.

Furthermore, at Step S705, the comparison test unit 404 that performs the comparison under the control of the difference calculating unit 435 gradually shifts the overlapping position of the master image and the read image in a test area of three pixels in height and width as described above, calculates a difference value for each of overlapping pixels, and calculates the total of the difference values. The difference calculating unit 435 compares the smallest total with a predetermined threshold to determine whether or not the test area is defective. That is, the difference calculating unit 435 functions as a image test unit by controlling the comparison test unit 404.

FIG. 8 is a diagram illustrating a concept of the test area for the comparison test performed by the difference calculating unit 435 and the comparison test unit 404. As illustrated in FIG. 8, each of the master image and the read image contains pieces of information on pixels $D_{11}, D_{12}, D_{13} \ldots D_{21}, D_{22}, D_{23} \ldots$. Each of the pixels $D_{11}, D_{12}, D_{13} \ldots$ is the information on 8-bit RGB colors as described above. The test area, for which the comparison test unit 404 calculates the total of the difference values and compares the total with the threshold under the control of the difference calculating unit 435, is an area of three pixels in height and width as indicated by $B_{11}, B_{12}, B_{21}, B_{22} \ldots$ surrounded by bold dashed lines in FIG. 8.

Therefore, as illustrated in FIG. 9, the difference calculating unit 435 sets "1" indicating a defect if the total of the difference values exceeds the predetermined threshold, and sets "0" indicating normal if the total of the difference values is lower than the predetermined threshold, for each of the test areas indicated by $B_{11}, B_{12} \ldots B_{21}, B_{22} \ldots$, so that a test for one read image is completed.

The test result generated for one read image as illustrated in FIG. 9 is input to a comparison result notifying unit 436. If the test result acquired from the difference calculating unit 435 contains an area determined as defective, the comparison result notifying unit 436 transmits the test result to the engine control unit 202 of the engine controller 2. Accordingly, the engine control unit 202 re-prints the image for which the defect is notified. Alternatively, the comparison result notifying unit 436 may transmit information indicating the read image and a defect determination result as illustrated in FIG. 9 to an information processing apparatus, such as a PC. Accordingly, the information processing apparatus can visually display the test result and allow a user to take subsequent actions.

The test results generated for one read image as illustrated in FIG. 9 are also input to a defect group extracting unit 437. The defect group extracting unit 437 generates a group of test areas at neighboring positions from among the test areas determined as defective, based on the information indicating a defect or normal determined for each of the test areas as illustrated in FIG. 9, and determines a defect group that is assumed as a defect caused by the same reason (Step S706).

Figure 10:
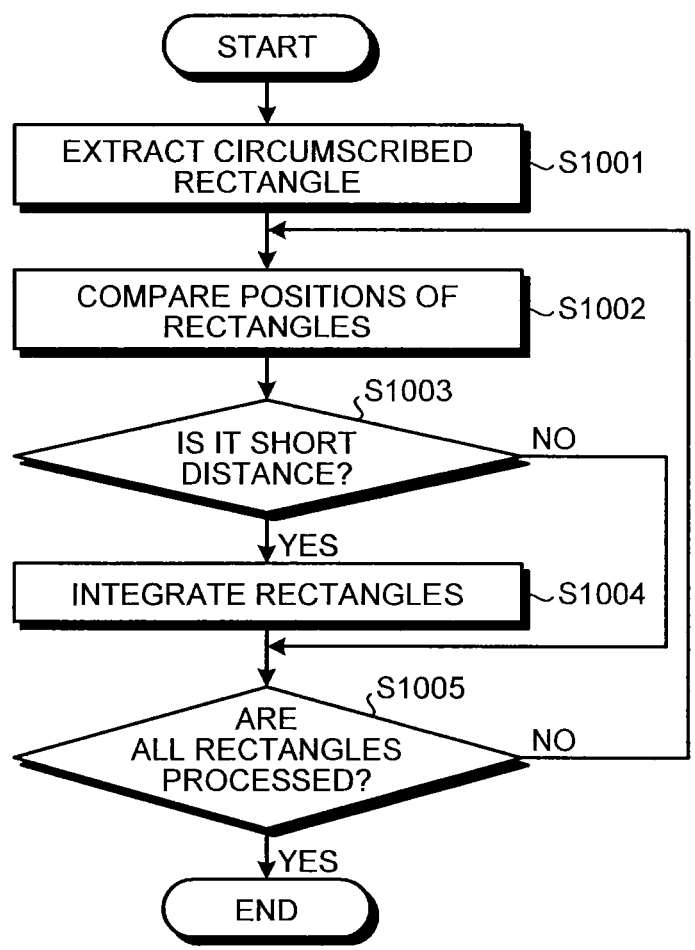
FIG. 10 is a flowchart illustrating defect group extraction operation according to the embodiment.

FIG. 10 is a flowchart illustrating defect group determination operation performed at Step S706 according to the embodiment. As illustrated in FIG. 10, the defect group extracting unit 437 extracts a circumscribed rectangle with respect to defected area determination results obtained for the respective test areas as illustrated in FIG. 9 (Step S1001). FIG. 11(a) is a diagram illustrating an example of the circumscribed rectangle with respect to the determination results as illustrated in FIG. 9, where the circumscribed rectangle is indicated by a bold dashed line. The defect group extracting unit 437 extracts circumscribed rectangles in the manner as illustrated in FIG. 11(a) for all of the test areas that are determined as defective in a determination target page.

After extracting the circumscribed rectangles of the defected areas, the defect group extracting unit 437 performs a process for comparing the positions of the respective rectangles in order to integrate rectangles located at relatively neighboring positions (Step S1002). At Step S1002, the defect group extracting unit 437 refers to the positions of selected two rectangles, that is, the coordinates of the two test areas. If the rectangles are located at a distance shorter than a predetermined threshold (YES at Step S1003), the defect group extracting unit 437 integrates the two rectangles into a defect group (Step S1004).

FIG. 11(b) illustrates an example in which two rectangles are integrated by the process at Step S1004. The left figure of FIG. 11(b) illustrates a state in which two circumscribed rectangles are extracted as illustrated in FIG. 11(a) by the process at Step S1001, and the two circumscribed rectangles are located close to each other. In the state in the left figure of FIG. 11(b), it is determined, at Step S1003, that the two rectangles are located close to each other, and the two rectangles are integrated, by the process at Step S1004, as illustrated by a bold dashed line in the right figure of FIG. 11(b). The process at Step S1004 is a process for integrating two rectangles into one rectangle. In other words, the process at Step S1004 is a process for further integrating the circumscribed rectangles, in each of which multiple test areas are already integrated, into a greater circumscribed rectangle.

The rectangle or the integrated area as described above is recognized as a single defect. Incidentally, as the threshold used at Step S1002, for example, 30, that is, a region of 90 pixels in the original coordinate expressed in pixel units, may be used. Furthermore, the circumscribed rectangles may be integrated by using a well-known technology, such as clustering.

In contrast, if the selected two rectangles are not located at a short distance (NO at Step S1003), no process is performed on the two rectangles. The defect group extracting unit 437 repeats the process from Step S1002 to compare the positions of the rectangles for all combinations of the rectangles extracted at Step S1001 (No at Step S1005). If the process is completed for all combinations of the rectangles (YES at Step S1005), extraction of the defect group is terminated. Through the process as described above, the defected areas located at neighboring positions are integrated and recognized as a single defect.

After completing the process at Step S706, the defect group extracting unit 437 counts the number of the defect groups each being recognized as a single defect, and stores a count result, as the number of defects, in a defect number information storage unit 439 in association with a page identification (ID) that identifies the page (Step S707). Namely, the defect group extracting unit 437 functions as a defect number determining unit. The process as described above is repeated at every image test, so that pieces of defect number information are accumulated as illustrated in FIG. 12. Incidentally, in FIG. 6, the defect number information storage unit 439 is illustrated as a part of the test control unit 403 for simplicity of the drawing. However, the defect number information storage unit 439 is a storage medium that can be accessed by a module in the test control unit 403, and may be implemented by, for example, a nonvolatile storage medium, such as the HDD 40, that is hardware of the test apparatus 4.

As illustrated in FIG. 12, the defect number information according to the embodiment contains a "page ID" for identifying the above-described test target page and a "defect number" indicating the number of the defect groups each being recognized as a single defect in the page, in an associated manner.

The test control unit 403 repeats the process from Step S701 until a predetermined determination timing occurs (NO at Step S708). If the determination timing occurs (YES at Step S708), a frequency distribution processing unit 438 operates according to the determination timing and determines a frequency distribution of the defect numbers based on the defect number information illustrated in FIG. 12. An abnormality determination unit 440 determines degradation of an apparatus based on the determined frequency distribution (Step S709). Through the above process, the test apparatus 4 according to the embodiment performs the operation.

The determination timing determined at Step S708 is set to cause the frequency distribution processing unit 438 to determine degradation of the print engine 3 at predetermined intervals. As a setting example of the determination timing, for example, the number of pieces of data of the defect number information illustrated in FIG. 12 may be used. Specifically, while pieces of data are being accumulated in the defect number information storage unit 439 by the repetition of the image comparison test, the frequency distribution processing unit 438 determines that the determination timing occurs every time a predetermined number of pieces of data of new page IDs are accumulated in the defect number information storage unit 439.

Alternatively, the determination timing as described above may be set to a timing at which a count value obtained at predetermined intervals reaches a predetermined value while the print engine 3 or the test apparatus 4 is powered on, or a timing at predetermined intervals in real time. In the explanation below, an example will be described in which the determination timing occurs every time 200 new pieces of data are stored in defect number information storage unit 439.

A frequency distribution process according to the embodiment will be explained below. In the process at Step S709 in FIG. 7, the frequency distribution processing unit 438 first counts the number of pieces of the defect number information for each set of a predetermined number of pieces of data illustrated in FIG. 12. To count the number of pieces of the defect number information, the frequency distribution processing unit 438 counts the number of pieces of the defect number information illustrated in FIG. 12 for each of the defect numbers. FIG. 13 is a diagram illustrating an example of a count result of the pieces of the defect number information counted by the frequency distribution processing unit 438. In the example in FIG. 13, the number of pieces of the defect number information is counted for each set of pieces of data of 200 successive pages. Namely, the frequency distribution processing unit 438 functions as a frequency distribution generating unit.

Figure 14:
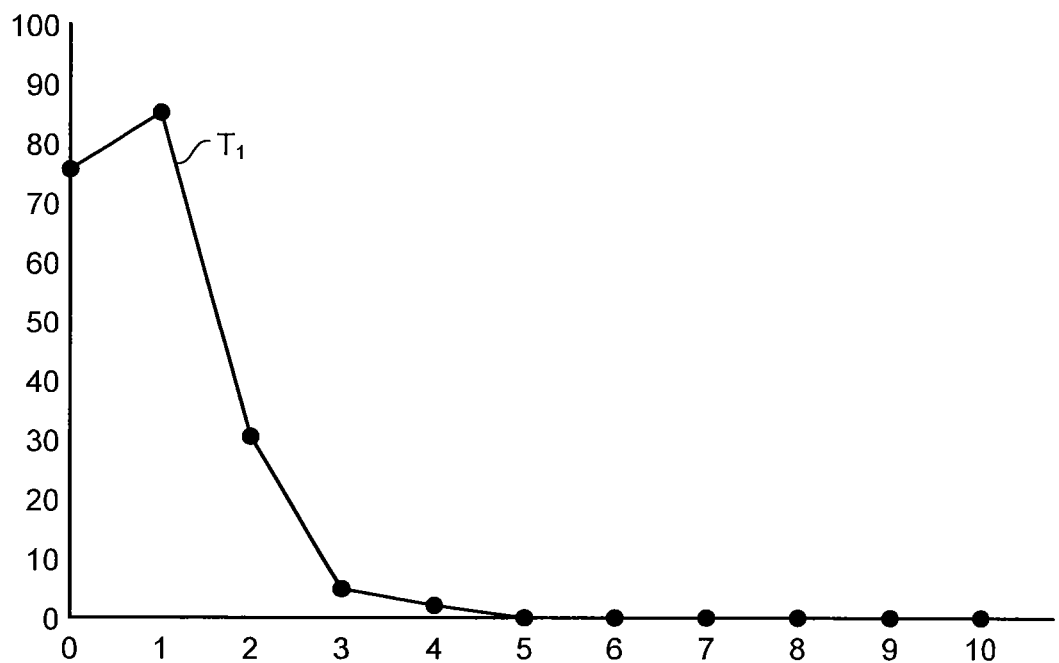
FIG. 14 is a diagram illustrating a frequency distribution graph according to the embodiment.

In the example in FIG. 13, it is indicated that, among the test results for 200 pages in a period $T_1$, there are "76" pages in each of which the defect number is zero, there are "86" pages in each of which the defect number is one, and there are "31" pages in each of which the defect number is two. With the counting as described above, it becomes possible to obtain a frequency distribution of the defect numbers per page with respect to the predetermined number of pieces of data. FIG. 14 illustrates a graph of a count result for the period $T_1$ illustrated in FIG. 13.

In the counting as described above, the frequencies of small defect numbers, such as zero and one, increase if the print engine 3 is in a good state and defects are less likely to occur in images, and the frequencies of large defect numbers increase as the state of the print engine 3 gets worse. The abnormality determination unit 440 according to the embodiment determines the state of the print engine 3 based on the frequency distribution of the defect numbers.

Figure 15:
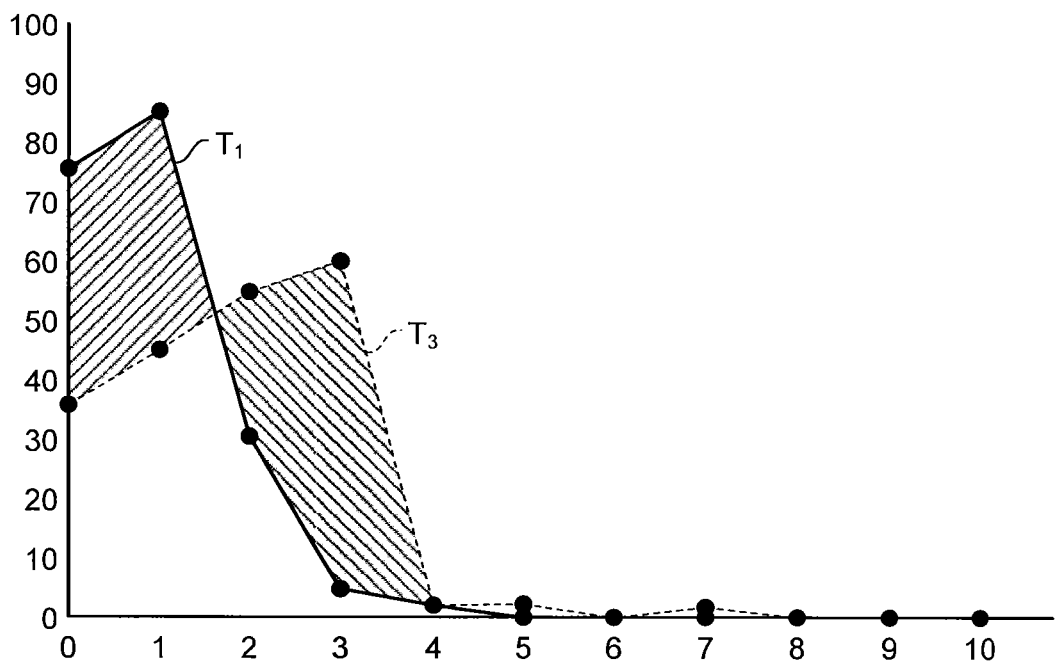
FIG. 15 is a diagram illustrating an example of comparison between frequency distribution graphs according to the embodiment.

FIG. 15 illustrates a graph of a count result for a period $T_3$ illustrated in FIG. 13, in addition to the graph for the period $T_1$ illustrated in FIG. 14. As illustrated in FIG. 15, the frequency distribution of the defect numbers moves from left to right in the graph, that is, from the small defect number side to the large defect number side, along with time as described above. This change can be determined by calculating an area of a region indicated by hatched lines in FIG. 15.

Specifically, the abnormality determination unit 440 according to the embodiment calculates the area of a region surrounded by a graph of pieces of data of latest 200 pages (hereinafter, referred to as "a latest graph"), a graph of pieces of data of 200 pages serving as a comparison target (hereinafter, referred to as "a comparison target graph"), and the X-axis and the Y-axis of the graph, and compares the area with a predetermined threshold to determine the current degradation state of the print engine 3.

If the area calculated as above exceeds the predetermined threshold, the abnormality determination unit 440 issues a notice indicating an abnormality (a failure) of the print engine 3. For example, the notice indicating a failure of the print engine 3 issued by the abnormality determination unit 440 is sent to an information processing apparatus, such as a PC, operated by an operator, or displayed as a graphical user interface (GUI) on a display device, such as the LCD 60, mounted on the test apparatus 4. Therefore, the test apparatus 4 can notify the operator of an abnormality (a failure) of an internal component of the print engine 3 in an easy manner.

Incidentally, the pieces of the data of 200 pages selected for the comparison target graph may be pieces of information obtained when operation of the print engine 3 has just started, that is, pieces of data of 200 pages on which images are formed and output when parts of all of the components of the print engine 3 are new. Accordingly, a state in which the print engine 3 is little degraded, that is, a state in which defects of images caused by the print engine 3 are least likely to occur, can be employed as the comparison target, and the current degradation state of the print engine 3 can be checked by comparison with the latest graph as described above.

Figures 16, 17:
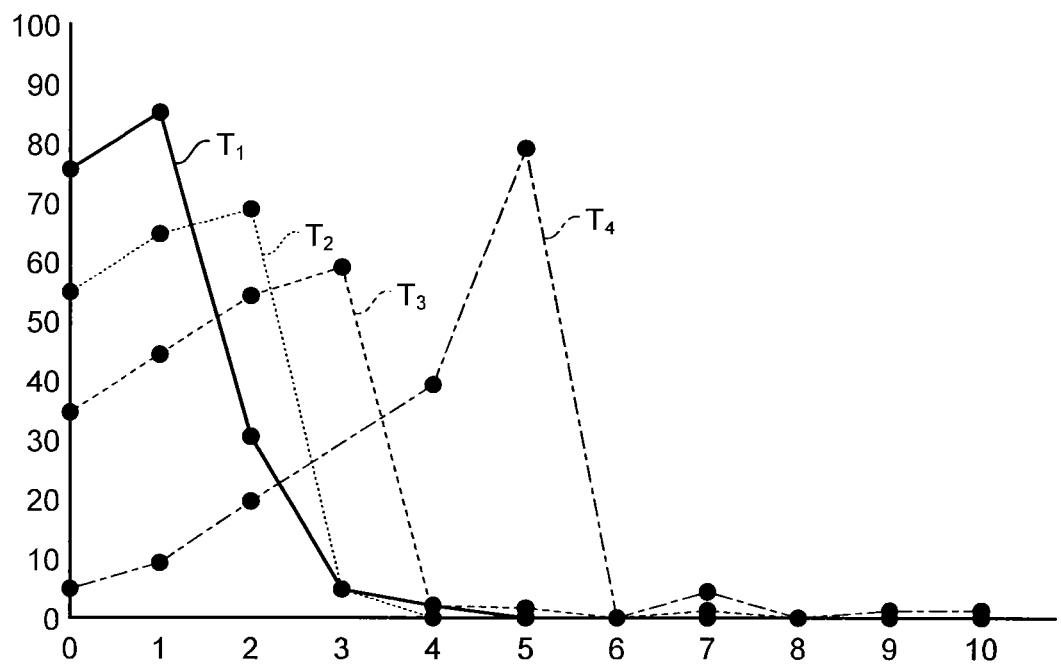
FIG. 16 is a diagram illustrating changes between the frequency distribution graphs according to the embodiment.
FIG. 17 is a diagram illustrating an extraction result of feature data of the frequency distribution graph according to the embodiment.

Meanwhile, as illustrated in FIG. 13, the count results of the defect number information are continuously generated at the determination timing determined at Step S708 in FIG. 7. Therefore, it may be possible to compare graphs of continuously-generated count results. FIG. 16 illustrates graphs of continuously-generated count results for the periods $T_1$, $T_2$, $T_3$, and the like as illustrated in FIG. 13 in a superimposed manner.

To compare the graphs of the continuously-generated count results, the graphs for the periods $T_1$ and $T_2$, the graphs for the periods $T_2$ and $T_3$, and the graphs for the periods $T_3$ and $T_4$ as illustrated in FIG. 16 are individually compared. It is conceived that the print engine 3 is gradually degraded due to continuous use. Therefore, if the degradation of the print engine 3 is caused only by time, comparison results, that is, differences in the areas, obtained by comparison of the graphs of the continuously-generated count results fall within a predetermined range.

In contrast, if the differences of the areas exceed the predetermined range as a result of the comparison of the graphs of the continuously-generated count results, a sudden failure may have occurred in the print engine 3. Therefore, by comparing the graphs of the continuously-generated count results and comparing the areas obtained by the comparison with a predetermined threshold, it becomes possible to eliminate degradation of the print engine 3 that has occurred over time and to detect only a sudden failure.

As described above, due to the above-described processing, through the image test, in which the read image obtained by reading an output result of image formation and the master image are compared with each other, the image forming system including the test apparatus 4 according to the embodiment can determine degradation of an apparatus based on a result of the image test.

Incidentally, in the example described in the embodiment, the degradation of the apparatus is determined based on the area surrounded by the graphs and the axes as explained above with reference to FIG. 15. Alternatively, it may be possible to calculate values (hereinafter, referred to as "feature data") indicating features of graphs of the count results of the defect number information as illustrated in FIG. 13, and determine the degradation of the apparatus based on a change in the feature data.

FIG. 17 is a diagram illustrating an example of pieces of feature data extracted by the abnormality determination unit 440 when the degradation of the apparatus is determined by comparison of the pieces of the feature data. For example, as illustrated in FIG. 17, the abnormality determination unit 440 calculates, as the pieces of the feature data, values of a "mode", a "percentage of the mode", a "percentage of values smaller than the mode", a "data width", a "degree of distortion", and a "kurtosis". The "mode" is a value corresponding to the greatest "count value" among the values of the "defect number" illustrated in FIG. 13. In the case of the period $T_1$ in FIG. 13, the greatest count value is "86", so that the mode becomes "1".

The "percentage of the mode" is a rate of the count value of the mode to the total of all of the count values. In the case of the period $T_1$ in FIG. 13, the percentage becomes "43" (=86/200×100). The "percentage of values smaller than the mode" is a rate of the total of the count values of the defect numbers between "0" and the mode to the total of all of the count values. In the case of the period $T_1$ in FIG. 13, the percentage becomes "81" (=(76+86)/200×100).

The "data width" is a value indicating a range of the defect numbers for which the "count values" other than "0" are distributed, that is, the width in the horizontal axis direction of the graph as illustrated in FIG. 14. In the case of the period $T_1$ in FIG. 13, the count values are distributed from the defect number of "0" to the defect number of "4", so that the data width becomes "5". The "degree of distortion" is a value as an indication of bias or distortion of the distribution, and becomes "0" in the case of a bilateral distribution, such as a normal distribution.

The degree of distortion may be calculated by using well-known statistical technologies. In general, the degree of distortion can be calculated by Equation (1) below, where $X_1$, $X_2$, ... or $X_n$ represents each piece of data (in this example, the count value of each "defect number" illustrated in FIG. 13), μ represents the average of the pieces of the data, and σ represents a standard deviation. In the case of the period $T_1$ in FIG. 13, the degree of distortion becomes "1.7".

$$\Sigma(Xi-\mu)^3/n\sigma^3 \quad (1)$$

The "kurtosis" is a value as an indication of the kurtosis of the distribution, and becomes "3" in the case of a normal distribution. The kurtosis may be calculated by using well-known statistical technologies. In general, the kurtosis can be calculated by Equation (2) below, where $X_1$, $X_2$, ... or $X_n$ represents each piece of data (in this example, the count value of each "defect number" illustrated in FIG. 13), μ represents the average of the pieces of the data, and σ represents a standard deviation. In the case of the period $T_1$ in FIG. 13, the kurtosis becomes "1.3".

$$\Sigma(Xi-\mu)^4/n\sigma^4 \quad (2)$$

The abnormality determination unit 440 calculates the pieces of the feature data as described above for each of the periods illustrated in FIG. 13, and calculates differences for the pieces of the feature data to thereby determine the degradation of the apparatus. The degradation of the apparatus can be determined by, for example, comparing the calculated difference values with a predetermined threshold. In this case, if the difference values are calculated as absolute values, the threshold can be set easily.

FIG. 18 is a diagram illustrating pieces of feature data calculated for the graphs for the periods $T_1$ and $T_3$ illustrated in FIG. 13, and differences between the pieces of the feature data. As illustrated in FIG. 18, the scales of values differ among the pieces of the feature data; therefore, it is difficult to set the same threshold for all pieces of the feature data. Therefore, it is preferable to set a threshold according to each piece of the feature data. Furthermore, to enable to collectively set a threshold for all pieces of the feature data, it may be possible to set weighting values to uniform the scales.

As another example of the comparison of the differences between the pieces of the feature data with the threshold, it may be possible to calculate the total of the calculated difference values illustrated in FIG. 18, and set a threshold for the total. In this case, it is preferable to calculate the total by multiplying weighting values corresponding to the scales of the pieces of the feature data or corresponding to the importance of the values, without adding up the calculated values as they are as illustrated in FIG. 18.

As described above, when a threshold to be compared with a difference value is individually set for each piece of the feature data, it is needed to set whether to determine that the apparatus is degraded when a difference value of at least one piece of the feature data exceeds the threshold or whether to determine that the apparatus is degraded when difference values of a predetermined number of pieces of the feature data exceed the thresholds. To cope with this, in the embodiment in which the threshold is set for the total of the difference values, it becomes possible to collectively perform the determination on all pieces of the feature data, enabling to achieve a simple and reasonable process.

If the degradation of the apparatus is to be determined by comparison of the feature data as explained above with reference to FIG. 17 and FIG. 18, it may be possible to compare the graphs of the continuously-generated count results rather than comparing the latest graph and the predetermined graph as explained in the example of the comparison of the areas. In any of the cases, a difference between the frequency distributions of the defect numbers is compared.

In the example described in the embodiment, when a difference between the frequency distributions of the defect numbers obtained by comparison of the count results exceed a threshold, it is determined that the apparatus is degraded and the notice is sent. However, it is difficult to determine which part of the apparatus is degraded only by the determination on the frequency distributions of the defect numbers. To cope with this, it may be possible to use the determination of the degradation based on the frequency distributions of the defect numbers as a trigger for operation of detailed determination of degradation of each part of the apparatus. This embodiment will be explained below.

Through the determination of the defect groups as explained above in the process at Step S706 in FIG. 7, it is possible to acquire the positions of the integrated defect groups in the read image, in addition to the number of defects in each of the pages as indicated by the pieces of the data illustrated in FIG. 12. FIG. 19 is a diagram illustrating information on the positions of the defect groups (hereinafter, referred to as "defect group positional information") acquired as described above. As illustrated in FIG. 19, in the defect group positional information according to the embodiment, the range of a rectangle determined as a defect is specified by coordinates "$X_s$", "$Y_s$", "$X_e$", and "$Y_e$" of test areas located at four corners of the rectangle for each "defect group ID" that identifies each of the defect groups.

The information as illustrated in FIG. 19 is generated by the defect group extracting unit 437 in the process at Step S706 in FIG. 7 for example, and stored in the defect number information storage unit 439 or other storage media. When determining that the apparatus is degraded through the degradation determination operation as described above, the abnormality determination unit 440 searches through a defect database (DB) that is registered in advance, based on the positions of defect groups registered in the defect group positional information illustrated in FIG. 19, and determines a part of the apparatus that has caused the detected defect group.

FIG. 20 illustrates the contents of the defect DB as described above. As illustrated in FIG. 20, in the defect DB, a "defect type ID" is assigned to each of defects that are defined in advance, and the range of a rectangle in which each defect is expected to occur is specified by coordinates "XS", "YS", "XE", and "YE" of test areas located at four corners of the rectangle, similarly to the defect group positional information illustrated in FIG. 19. Furthermore, information on a "defect type" indicating a faulty part of the print engine 3 that has caused each defect specified by the "defect type ID" is contained in an associated manner. The information as described above is stored in a storage medium, such as the HDD 40, that can be accessed by a module in the test control unit 403, similarly to the defect number information storage unit 439.

Figure 21:
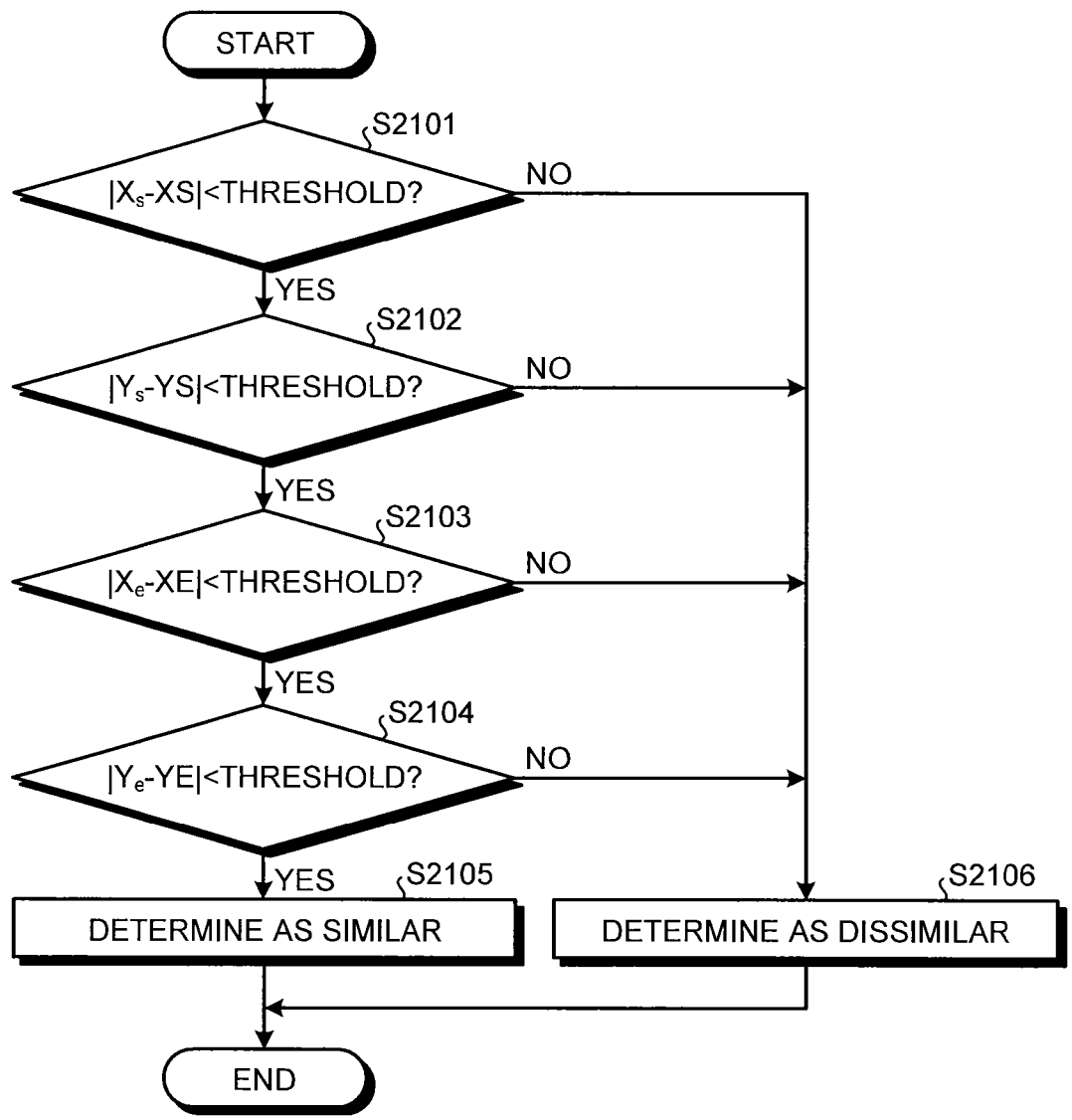
FIG. 21 is a flowchart illustrating operation for determining similarity of defect groups according to the embodiment.

As described above, the defect DB according to the embodiment is defect type information, in which a type of a failure of the print engine 3 serving as the image forming apparatus and the position of a determined defect in the image are associated with each other. The frequency distribution processing unit 438 compares the position of each of the extracted defect groups, that is, the information on "$X_s$", "$Y_s$", "$X_e$", and "$Y_e$" illustrated in FIG. 19 with the information on "XS", "YS", "XE", and "YE" of each of the defect types contained in the defect DB illustrated in FIG. 20, to thereby determine whether or not the pieces of the information are similar to each other based on the respective positions. FIG. 21 is a flowchart illustrating detailed operation for determining defect types.

As illustrated in FIG. 21, the frequency distribution processing unit 438 compares a predetermined threshold with the absolute values of difference values between "$X_s$" and "XS" (Step S2101), between "$Y_s$" and "YS" (Step S2102), between "$X_e$" and "XE" (Step S2103), and between "$Y_e$" and "YE" (Step S2104). As the threshold used in this process, for example, 10, that is, a region of 30 pixels in the original coordinate expressed in pixel units, may be used.

As a result of the determination from Step S2101 to Step S2104, if all of the difference values are less than the predetermined threshold, the frequency distribution processing unit 438 determines that the defect group serving as a comparison object and the defect type are similar to each other (Step S2105). In this case, the abnormality determination unit 440 notifies an external apparatus of the defect type determined as similar, and terminates the process. In contrast, if any of the difference values exceeds the threshold, it is determined that the defect group serving as a comparison object and the defect type are dissimilar from each other (Step S2106). In this case, the abnormality determination unit 440 determines that the apparatus is not degraded, and terminates the process.

Through the above process, it becomes possible to determine a particular degraded part of the apparatus. Furthermore, by using the determination of the frequency distributions of the defect numbers according to the embodiment as a trigger to start detailed determination as described above, it becomes possible to reduce the number of operations explained above with reference to FIG. 20, so that the operation of the apparatus can be controlled efficiently.

In the example described in the embodiment, the defect group positional information as illustrated in FIG. 19 is generated at Step S706 in FIG. 7. However, a defect caused by degradation of the apparatus may continuously occur in multiple pages instead of a sudden manner. Therefore, the defect group positional information to be compared with in the operation illustrated in FIG. 21 may be generated based on a defect group that is extracted at similar positions in multiple pages, instead of a defect group extracted by a comparison test performed on a single page. With this configuration, the accuracy of the determination of degradation of the apparatus can be improved.

As a method to determine a defect that has continuously occurred in multiple pages, for example, it may be possible to accumulate values of "1" indicating a defect as a determination result obtained for each of the test areas as explained above with reference to FIG. 9, and apply a predetermined threshold to the accumulation result to obtain a binary result. Specifically, it can be assumed that, in a test area with the binary result of "1", a defect has continuously occurred in multiple pages. Furthermore, as described above, it is possible to perform determination for each pixel instead of for each test area.

Moreover, in the example described in the embodiment, it is determined that the apparatus is degraded and the process is terminated when a similar defect type is not extracted from the defect DB. However, if the apparatus is likely to have been degraded due to the fact that a defect is extracted at similar positions in multiple pages as described above or due to the frequency distributions of the defect numbers as described in the embodiment, it may be possible to register the information on "$X_s$", "$Y_s$", "$X_e$", and "$Y_e$" of the extracted defect group as the information on "XS", "YS", "XE", and "YE" in the defect DB. In this case, an operator can update the defect DB as needed, by inputting information on a defect type for the registered data at a later time.

Furthermore, in the example described in the embodiment, a difference value of pixel values and a threshold are compared with each other for each test area of three pixels in height and width as illustrated in FIG. 8. In this embodiment, it is possible to prevent a false detection of a defect due to positional deviation even when the positions of the read image and the master image are not completely aligned. However, it may be possible to compare a difference value of pixel values and a threshold for each of pixels depending on the precision of the read image and the master image. Even in this case, it is possible to achieve the same advantageous effects as described above by extracting the circumscribed rectangles or extracting a defect group by integrating the rectangles as explained above with reference to FIGS. 11(*a*) and 11(*b*).

Moreover, in the example described in the embodiment, degradation of the print engine 3 is determined. However, because the image comparison test is a comparison test between the read image and the master image, a defect may occur when the read image is generated by the reading device 302, that is, the reading device 302 may be degraded. Therefore, when the apparatus is determined as defective based on the frequency distributions of the defect numbers, it is preferable to send a notice indicating the possibility that the reading device 302 may also be degraded.

Furthermore, in the determination of a degraded part based on the defect DB as explained above with reference to FIG. 21, it is preferable to analyze a defect caused by degradation of the reading device 302, and register defect type data indicating degradation of the reading device 302 as data of the defect DB illustrated in FIG. 20. With this configuration, it becomes possible to determine a degraded part including the reading device 302.

According to an embodiment of the present invention, through an image test in which an image obtained by reading an output result of image formation is compared with a master image, it is possible to determine degradation of an apparatus based on a result of the image test.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image test apparatus that tests at least one read image obtained by reading at least one image formed and output on at least one sheet by an image forming apparatus, the image test apparatus comprising:
    an image generating unit configured to acquire an output target image with which the at least one image is formed and output by the image forming apparatus, and generate a test image for testing the at least one read image;
    an image test unit configured to determine a defect of each of pixels of the at least one read image based on a difference between a density of each of pixels in the test image and a density of each of the pixels in the at least one read image, each of the pixels in the at least one read image corresponding respectively to each of the pixels in the test image;
    a defect number determining unit configured to determine number of defects contained in the at least one read image based on a determination result of the defect of the at least one read image;
    a frequency distribution generating unit configured to accumulate defect numbers of multiple read images, each of the defect numbers being the number of defects detected in one read image, and generate a frequency distribution of the defect numbers; and
    an abnormality determination unit configured to determine an abnormality of the image forming apparatus based on a change in the frequency distribution generated for each predetermined period.

2. The image test apparatus according to claim 1, wherein
    the image test unit determines a defect of the at least one read image for each predetermined region in the at least one read image, and
    the defect number determining unit integrates defected areas within the predetermined region in the at least one read image among defected areas determined as defective, and determines number of the integrated defected areas as the number of defects contained in the at least one read image.

3. The image test apparatus according to claim 1, wherein the abnormality determination unit determines an abnormality of the image forming apparatus when an area of a region surrounded by a graph of a latest frequency distribution, a graph of an older frequency distribution, x-axis passed through the origin, and y-axis passed through the origin is equal to or greater than a predetermined threshold.

4. The image test apparatus according to claim 1, wherein the abnormality determination unit determines an abnormality of the image forming apparatus when a difference between feature data extracted from a shape of a graph of a latest frequency distribution and feature data extracted from a shape of a graph of an older frequency distribution is equal to or greater than a predetermined threshold.

5. The image test apparatus according to claim 1, wherein the abnormality determination unit determines an abnormality of the image forming apparatus when a difference between a latest frequency distribution and a predetermined frequency distribution is equal to or greater than a predetermined threshold.

6. The image test apparatus according to claim 1, wherein the abnormality determination unit determines an abnormality of the image forming apparatus when a difference between a latest frequency distribution and a second latest frequency distribution is equal to or greater than a predetermined threshold.

7. The image test apparatus according to claim 1, wherein the frequency distribution generating unit generates the frequency distribution every time number of defects is determined through determination of defects for a predetermined number of read images.

8. The image test apparatus according to claim 1, wherein
    the defect number determining unit determines a position of a defect in the at least one read image, and
    when determining an abnormality of the image forming apparatus based on a change in the frequency distribution, the abnormality determination unit refers to defect type information in which a type of an abnormality of the image forming apparatus and the position of the defect in the at least one read image are associated with each other, and determines the type of the abnormality of the image forming apparatus based on the position of the defect in the at least one read image.

9. The image test apparatus according to claim 1, wherein the image test unit determines that there is a defect at a pixel in the at least one read image when a difference between a density of the pixel in the at least one read image and a density of a corresponding pixel in the test image exceeds a predetermined threshold.

10. An image test system that tests at least one read image obtained by reading at least one image formed and output on at least one sheet, the image test system comprising:
    an image forming unit configured to form and output the at least one image;
    an image reading unit configured to read the at least one sheet on which the at least one image is formed and output, and generate the at least one read image;
    a test image generating unit configured to acquire at least one output target image with which the at least one image is formed and output by the image forming unit, and generate a test image for testing the at least one read image;
    an image test unit configured to determine a defect of each of pixels of the at least one read image based on a difference between a density of each of pixels in the test image and a density of each of the pixels in the at least one read image, each of the pixels in the at least one read image corresponding respectively to each of the pixels in the test image;

a defect number determining unit configured to determine number of defects contained in the at least one read image based on a determination result of the defect of the at least one read image;

a frequency distribution generating unit configured to accumulate defect numbers of multiple read images, each of the defect numbers being the number of defects detected in one read image, and generate a frequency distribution of the defect numbers; and an abnormality determination unit configured to determine an abnormality of at least one of the image forming unit and the image reading unit based on a change in the frequency distribution generated for each predetermined period.

11. An image test method that tests at least one read image obtained by reading at least one image formed and output on at least one sheet by an image forming apparatus, the image test method comprising:

generating the at least one read image by reading the at least one sheet on which the at least one image is formed and output;

generating a test image for testing the at least one read image by acquiring at least one output target image with which the at least one image is formed and output by the image forming apparatus;

determining a defect of each of pixels of the at least one read image based on a difference between a density of each of pixels in the test image and a density of each of the pixels in the at least one read image, each of the pixels in the at least one read image corresponding respectively to each of the pixels in the test image;

determining number of defects contained in the at least one read image based on a determination result of the defect of the at least one read image;

accumulating defect numbers of multiple read images, each of the defect numbers being the number of defects detected in one read image, thereby generating a frequency distribution of the defect numbers; and determining an abnormality of the image forming apparatus based on a change in the frequency distribution generated for each predetermined period.

* * * * *